United States Patent

[11] 3,577,165

[72] Inventors Bradley A. Helliwell
Mountain View;
Donald D. Briglia, Palo Alto, Calif.
[21] Appl. No. 733,564
[22] Filed May 31, 1968
[45] Patented May 4, 1971
[73] Assignee The Perkin-Elmer Corporation
Norwalk, Conn.

[54] LINEAR SCANNING ARRANGEMENT FOR A CYCLOIDAL MASS SPECTROMETER
9 Claims, 10 Drawing Figs.
[52] U.S. Cl. ..................................................... 307/228,
250/83.6, 307/229, 324/33, 324/118, 328/181, 330/10
[51] Int. Cl. ..................................................... H03k 5/00,
H03k 7/00, H03k 9/00
[50] Field of Search ............................................ 307/228,
229, 230; 328/181, 142—145; 315/19, 26, 27, 28;
250/41.92, 41.93, 83.6; 324/33, 118; 330/10

[56] References Cited
UNITED STATES PATENTS
3,478,203 11/1969 Brown ........................... 250/41.9

*Primary Examiner*—Stanley D. Miller, Jr.
*Attorney*—Edward R. Hyde, Jr.

ABSTRACT: A partial pressure gauge scanning circuit arrangement for generating an electrostatic ion beam deflection voltage having a deflection waveform segment defined by the function $V=f(1/t)$, where V=deflection voltage and $t$=time, includes a circuit means having a nonlinear transfer characteristic, the derivative of which is proportional to the function $f(1/t)$. Circuit means apply an alternating signal of frequency $f_1$ and a signal of relatively lower frequency $f_2$ to the nonlinear circuit means in a manner for providing an amplitude modulated output signal of frequency $f_1$. The output signal exhibits a modulation envelope defined by the differential of the logarithmic characteristic. Circuit means are provided for demodulating and integrating the amplitude modulated signal to provide a scanning output signal having a waveform defined as an inverse function of time.

INVENTORS,
Bradley A. Helliwell
BY Donald D. Brigilia

Frank J. Thompson
ATTORNEY.

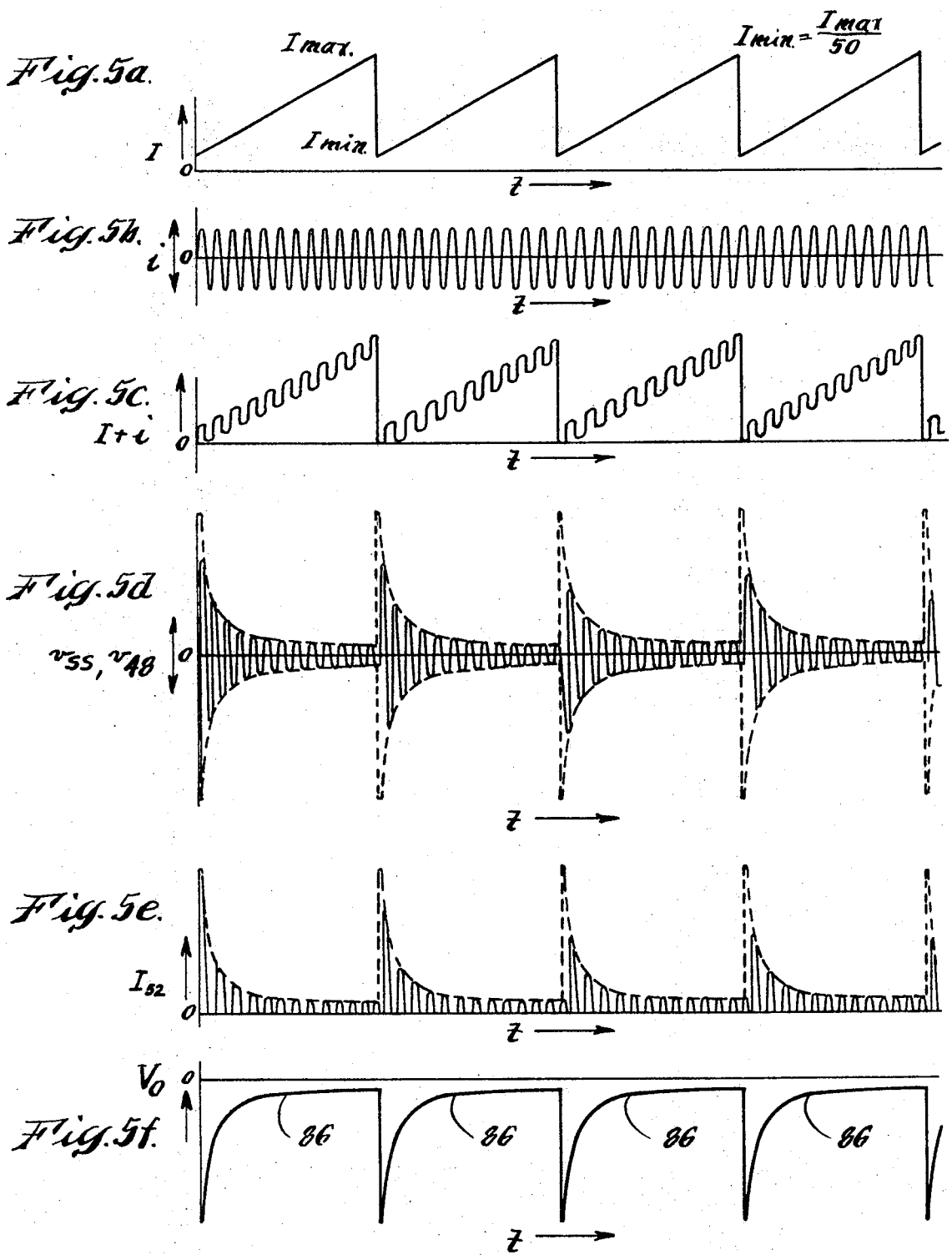

LINEAR SCANNING ARRANGEMENT FOR A CYCLOIDAL MASS SPECTROMETER

This invention relates to analytical instruments. The invention relates more particularly to electrostatic scanning arrangements for deflecting a beam of particles in an analytical instrument.

In various forms of analytical instruments, it is desirable to periodically deflect a beam of particles across a target. A partial pressure gauge is one such form of instrument and comprises a cycloidal mass spectrometer which is adapted for mass analyzing residual gases in an evacuated enclosure. This instrument is vacuum coupled to the enclosure and molecules of the residual gases flow thereto for analysis. The residual molecules are ionized by the spectrometer and ions thus formed are accelerated along a path through crossed electric and magnetic fields toward an output aperture in a target. Ions passing through the output aperture are collected on an ion collector or excite a particle multiplier and an output signal thereof is amplified and applied to a mass recording or display means. Mass analysis is effected by varying the magnitude of one of the fields with time thereby focusing ions of successively increasing or decreasing mass at the output aperture. A qualitative and quantitative indication of the residual gas is then provided.

For various reasons including reduction of instrument complexity and cost, it is desirable to provide electrostatic scanning of the ion beam by varying the electric field of the gauge. It is also desirable to provide a linear display of mass with respect to time. However, the application of a deflection potential causing the electric field of the gauge to vary linearly with time results in a nonlinear mass display in an instrument having a linearly operated recording or display means. It is known that an electric field represented by an inverse function, i.e., $e = f(1/t)$ provides a linear mass output indication. The generation of an electric deflection potential represented by this function is rendered relatively difficult however insofar as conformance of the generated waveform to the desired function is concerned. In prior scanning systems, the $f(1/t)$ function has been approximated by exponential decay circuits or a diode arrangement adapted to provide curve approximation. These arrangements however provide output signals exhibiting significant variations from the desired function. A relatively extended sweep interval is employed with a partial pressure gauge, i.e., on the order of 30—300 seconds, and electrical noise which disadvantageously accompanies an extended sweep of this order further increases the circuit requirements.

Accordingly, it is an object of this invention to provide an improved electrostatic ion beam deflection arrangement for an analytical instrument.

Another object of the invention is to provide an improved circuit arrangement for generating an electric field which varies in amplitude as an inverse function of time.

A further object of the invention is to provide an improved circuit arrangement for generating the voltage function $V = f(1/t)$.

Still another object of the invention is to provide an improved circuit arrangement for generating a repetitive voltage scanning function $V = f(1/t)$ having a relatively extended deflection interval.

In accordance with the general features of the present invention, a scanning circuit arrangement for generating an electric scanning signal having a deflection waveform segment defined by the function $e = f(1/t)$ includes circuit means having a nonlinear transfer characteristic, the derivative of which is representative of the desired inverse function $f(1/t)$. Circuit means apply an alternating signal of frequency $f_1$ and a sawtooth signal of relatively lower frequency $f_2$ to the nonlinear circuit means in a manner for providing an amplitude modulated output signal of frequency $f_1$ having a modulation envelope defined by the differential of the logarithmic characteristic. Circuit means are provided for demodulating and integrating the amplitude modulated signal to thereby provide a scanning output signal having a waveform defined as an inverse function of time.

In accordance with more particular features of this invention, the nonlinear circuit means includes a transistor having an exponential current characteristic. The differential of this characteristic, and which is proportional to the function $f(1/t)$, represents the resistive output impedance for relatively small signals. Application of a relatively small signal of frequency $f_1$ and of constant amplitude and a sawtooth current which varies the transistor operating point over the small signal range during a scanning interval provides an output signal of frequency $f_1$ having an envelope which is proportional to $(1/t)$.

These and other advantages and features of the invention will become apparent with reference to the following specifications and drawings wherein:

FIG. 5 is a diagram illustrating the waveform appearing at various points in the circuit of FIG. 3.

Figure 1:
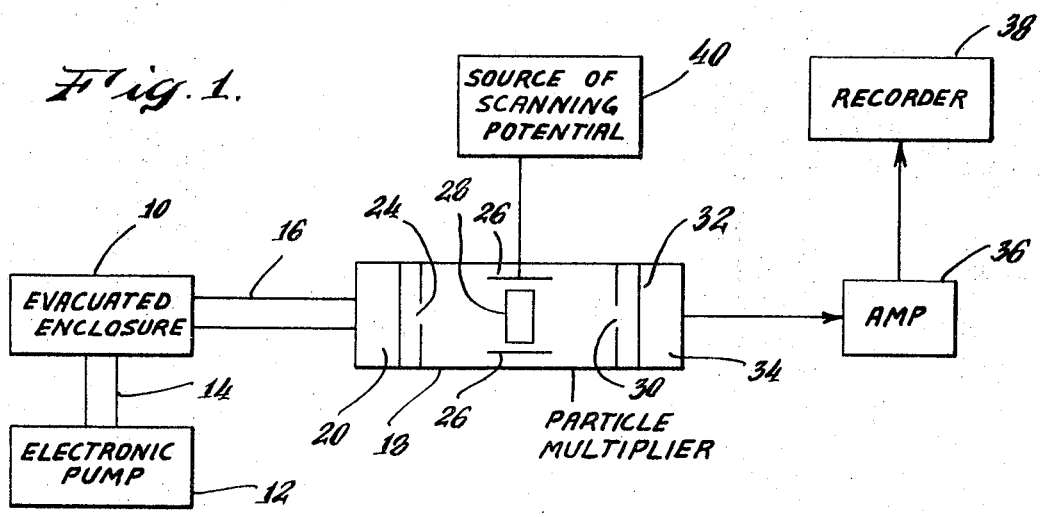
FIG. 1 is a diagram, partially in block form illustrating a partial pressure gauge employed for mass identification of residual gases in an evacuated chamber.

Referring now to FIG. 1, a partial pressure gauge is shown coupled to an enclosure 10 for measuring the partial pressure of residual gases within the enclosure. The enclosure is pumped by an electronic vacuum pump 12 such as an ion pump which is coupled to the enclosure 10 through a suitable vacuum sealed coupling 14. The partial pressure gauge, which is coupled to the enclosure 10 through a vacuum sealed coupling 16, includes an evacuated chamber indicated generally as 18 and an ion source indicated generally as 20. Gaseous molecules leak into the ion source 20 from the enclosure 10 and are bombarded by an electron beam in the ion source to form ions for mass analysis. These ions are accelerated through the chamber 18 by virtue of an electric accelerating field established by an accelerating electrode 22. Ions passing through an aperture 24 in this electrode traverse an electric field established by electrodes 26 and magnetic field established by a magnet 28. These fields are mutually perpendicular and cause the ions to follow a cycloidal path. The ions upon leaving these fields impinge upon a target 30 having an aperture 32 located therein. Ions passing through the aperture strike an ion collector or a particle multiplier 34, the output of which is coupled to an amplifier 36 for application to a recording means 38 such as a strip chart recorder or other visual display means. Mass separation is effected by applying a time varying potential to electrodes 26 for causing ions of successively increasing or decreasing mass to be focused at the output aperture 32. An output spectrum thereby generated comprises peaks with mass numbers $m/e$ indicative of the residual gases and amplitudes indicative of the relative abundance of the residual gas.

Figure 2:
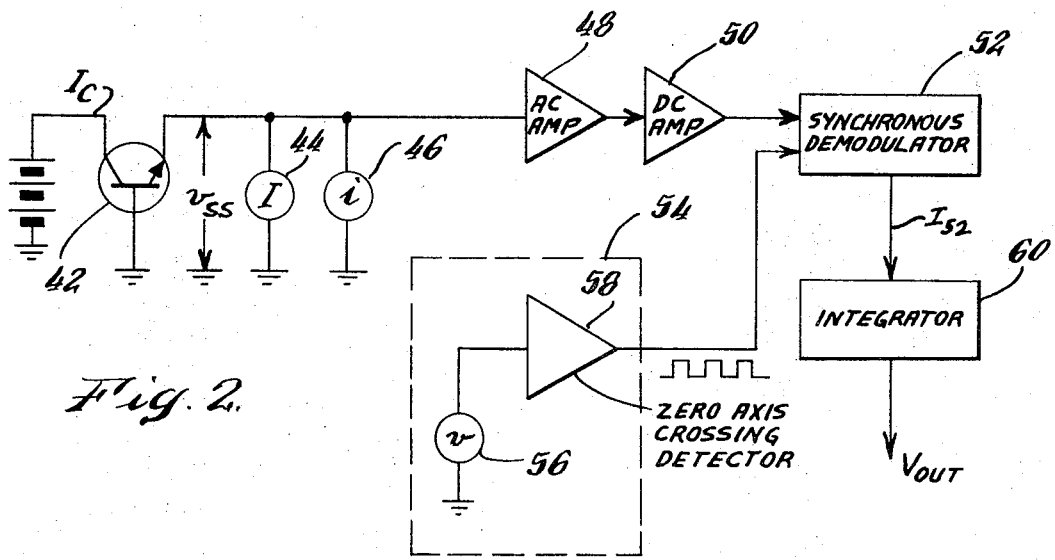
FIG. 2 is a block diagram of a scanning circuit arrangement constructed in accordance with features of the invention.
Figure 4:
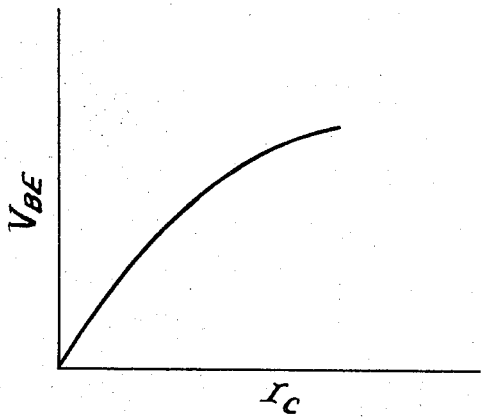
FIG. 4 is a diagram illustrating an exponential relationship between collector current and base-emitter voltage for a transistor employed in a common base amplifier configuration.

In accordance with a feature of this invention, a scanning potential which is an inverse function of time, i.e., $V = f(1/t)$, is established at the electrodes 26. FIG. 2 illustrates a circuit arrangement in accordance with features of this invention for generating a scanning waveform of the desired function. The circuit utilizes a nonlinear element comprising the transistor 42 which exhibits an exponential collector current $I_c$ versus base-emitter voltage characteristic for small signals in a common base amplifier configuration as indicated in FIG. 4. The base-emitter biasing current is provided by a current of sawtooth waveform as illustrated in FIG. 5a, and which is derived from a source 44. Various sawtooth current generators are known in the art which are suitable for generating this waveform and for a detailed description, reference is made to "Pulse and Digital Circuits," Millman and Taub, McGraw Hill Book Co., 1965. An alternating signal of frequency $f_1$ is provided by a constant current source 46 and is similarly coupled between the base and emitter electrodes. This signal is illustrated in FIG. 5b and the resultant signal current applied between emitter and base is illustrated in FIG. 5c.

In the common base amplifier configuration shown, the collector current $I_c$ is given by:

$$I_c = I_s e^{(qV_{BE}/KT)} \quad (1)$$

where $I_s$ = saturation current
$q$ = electronic charge in coulombs
$V_{BE}$ = base-emitter voltage
$K$ = Boltzmann's constant
$T$ = temperature in degrees Kelvin It can be shown that the derivative of this expression, i.e., $dV^{be}/dI_c$, is equal to the small signal resistance $r_{ss}$ looking into the emitter, and is given by:

$$r_{ss} = /I_c, \text{ at constant temperature} \quad (2)$$

and where $k$ = constant.

The current source 44 provides a sawtooth current having a scanning segment in accordance with the function:

$$I = ct. \quad (3)$$

where $c$ = constant and $t$ = time.

In addition the signal source 46 provides a current:

$$i = I_m \cos w_o t \quad (4)$$

where $I_m$ = peak current of $i$ and $w_o = 2f_1$ for relatively large current gains in the transistor 42, $I = I_c$ and, $$r_{ss} = /ct.$$

Since the source 46 represents a constant current source, the small signal emitter-to-base voltage $v_{ss}$ is given by:

$$v_{ss} = ir_{ss} = /ct.$$

Thus:

$$v_{ss} \propto 1/t.$$

Thus, an output voltage $v_{ss}$ between emitter and base electrodes comprises an amplitude modulated signal of frequency $f_1$ having an envelope defined by the differential of the exponential characteristic of the collector current $I_c$ versus $V_{BE}$. A waveform of this output voltage is illustrated in FIG. 5d.

Circuit means are provided for amplifying the modulated signal $v_{ss}$ and for detection to provide an output scanning signal $V_{out}$ having trace segments defined by the exponential characteristic of the transistor 42. The amplifying circuit means includes an operational AC amplifier 48 which removes the DC component present with $v_{ss}$ to provide an amplified signal $v_{48}$, FIG. 5d. A DC amplifier couples this signal to a synchronous demodulator 52. In addition, a reference signal is derived from a source 54 and applied to the demodulator 52. The reference signal source 54 includes an alternating voltage source 56 of frequency $f_1$ which is synchronized to the constant current generator 46. The reference voltage and current $i$ are in practice derived from a common signal source adapted for providing a voltage and constant current output. The alternating reference voltage is applied to a wave-shaping circuit 58 which is simply a differential amplifier 76 overdriven at terminal 5 by the AC coupled reference voltage providing a synchronized square wave output. This square wave output signal is applied to the synchronous demodulator 52 and a detected output thereof, FIG. 5e, is integrated by an integrator circuit 60 for providing the output scanning signal of FIG. 5f. The output signal, $V_{out}$, thus comprises a scanning potential having a trace segment 86 which varies in amplitude in accordance with the function $f(1/t)$.

Figure 3:
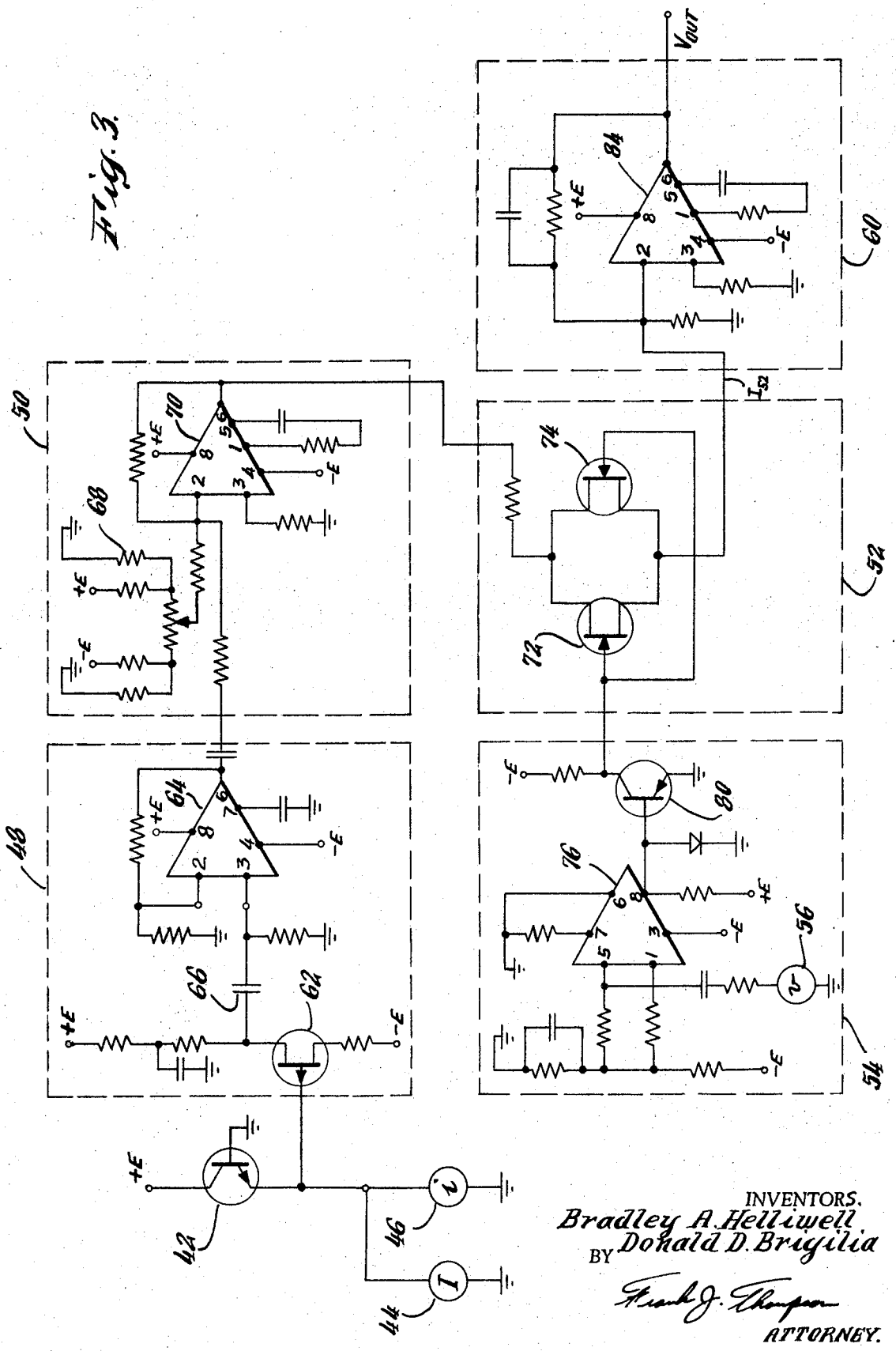
FIG. 3 is a detailed schematic diagram of the circuit arrangement of FIG. 2.

The circuit arrangement of FIG. 2 is illustrated in greater detail in FIG. 3. Those elements of FIG. 2 represented symbolically in FIG. 2 are illustrated in dashed rectangles in FIG. 3 and bear similar reference numerals. The output signal of transistor 42 is applied to the AC operational amplifier 48 by a field effect transistor 62 which provides desired impedance matching between the input of the voltage amplifier 64 and the output impedance of the transistor 42. A DC component in the input signal $v_{ss}$ is removed by coupling capacitor 66 and the amplifier 64 provides a voltage amplified representation of the AC signal $v_{48}$. This signal is coupled to the DC amplifier 50 for further amplification. Amplifier 50 includes an offset setting network 68 and operational amplifier arrangement 70.

Synchronous demodulation is provided by field effect transistors 72 and 74 which are arranged as an electronic switch. The alternating reference signal from source 56 is applied to a squaring circuit including an amplifier 76 biased in a manner for clipping the peaks of the input sine wave to provide a substantially rectangular output. This output signal is clamped at ground potential by transistor 80 saturated with current out of amplifier 76, and clamped at −E by transistor 80 cutoff by forward biased diode 78 when the current out of amplifier 76 goes to zero. This signal alternating between ground and −E is applied to gate electrodes of the switch transistors 72 and 74. The amplitude modulated signal of frequency $f_1$ is coupled from the DC amplifier 50 to drain electrodes of these transistors while an output thereof is derived from source electrodes and is coupled to the integrator circuit 60. The voltage source 56 and the current source 46 are synchronized and of the same frequency $f_1$. The switch is arranged for providing that the square wave output signal from transistor 80 causes conduction on positive alternations of the amplitude modulated input signal at the drain electrodes.

The integrator circuit 60 includes an operational amplifier 84 arranged as an integrating amplifier. This circuit smooths out the pulses of current coming out of the synchronous switch to provide an output trace segment 86 as illustrated in FIG. 5f.

In an illustrative example which is not deemed to be limiting in any respect, the following components have provided satisfactory operation with the circuit arrangement of FIG. 3.

| Transistor 42. | Type—2N5088. |
|---|---|
| +E | +15 volts. |
| (I) | Scan segment extending from a minimum amplitude of 20 μa. to a maximum amplitude of 1 ma. Scan interval = 30 sec., 1 sec. retrace. |
| (i) | $I_m = 2\mu a.$; frequency = 1kc. |
| Amplifier 64, 70, 84. | Integrated circuit, Amelco 809 C.E. |
| Amplifier 76 | Integrated circuit, RCA CA-3028. |
| Transistor 62 | Type 2N4360, Fairchild. |
| Transistor 72, 74. | Type MPF-105, Motorola. |
| Transistor 80 | Type 2N5087, Motorola. |

An improved scanning arrangement has thus been described which generates a scanning function $V = f(1/t)$ with a relatively high degree of accuracy and relatively low complexity and cost.

While we have illustrated and described a particular embodiment of our invention, it will be understood that various modifications may be made therein without departing from the spirit of the invention and the scope of the appended claims.

We claim:

1. A scanning circuit arrangement comprising:
    first circuit means having a nonlinear transfer characteristic representative of the function $f(1/t)$;
    second circuit means for applying a scanning signal of frequency $f_2$ and an alternating signal of frequency $f_1$ to said first circuit means;
    third circuit means coupled to said first circuit means for deriving an amplitude modulated signal having a frequency $f_1$ from said first circuit means; and
    fourth circuit means for demodulating said amplitude modulated signal for providing an output scanning signal defined by the function $f(1/t)$.

2. The scanning circuit arrangement of claim 1 wherein said first circuit means includes a diode having a nonlinear transfer characteristic.

3. The scanning circuit arrangement of claim 2 wherein said first circuit means includes a semiconductor amplifying device and said diode comprises a base-emitter diode of said device.

4. The scanning circuit arrangement of claim 3 wherein said transistor is arranged in a common base amplifier configuration and said transistor exhibits an exponential collector current versus base-emitter voltage characteristics.

5. The scanning circuit arrangement of claim 4 wherein said scanning signal and alternating signal are applied between emitter and base electrodes of said transistors and said output signal is derived between emitter and base electrodes of said transistor.

6. The scanning circuit arrangement of claim 5 wherein said alternating signal of frequency $f$ is provided by a constant current signal source.

7. The scanning circuit arrangement of claim 1 wherein said demodulating circuit means comprises a synchronous demodulator and a source of reference signal coupled to said demodulator.

8. A scanning circuit arrangement comprising:
a transistor having base and emitter electrodes arranged in a common base amplifier configuration, said transistor having a logarithmic collector current versus emitter-base voltage characteristic;
a source of scanning current having a generally sawtooth-shaped waveform coupled between said emitter and base electrodes;
a constant current source of alternating current of frequency $f_1$ coupled between said emitter and base electrodes;
a synchronous demodulator circuit arrangement adapted for demodulating an amplitude modulated signal applied thereto in synchronism with a reference signal;
amplifying circuit means coupled between said transistor emitter and base electrodes and said demodulator for deriving an amplitude modulated signal from said transistor and coupling the amplitude modulated signal to said demodulator for detection;
circuit means for applying a reference signal of frequency $f_1$ to said demodulator; and
integrator circuit means coupled to said demodulator for integrating a demodulated signal to provide a scanning output signal having an amplitude which varies as an inverse function of time.

9. The scanning circuit arrangement of claim 8 wherein said source of alternating current of frequency $f_1$ and said reference signal comprise a sinusoidal oscillating circuit arrangement adapted for providing a reference voltage output for coupling to said demodulator and a constant current output for coupling to said transistor.